United States Patent [19]
Abt et al.

[11] 4,433,613
[45] Feb. 28, 1984

[54] POWER STEERING SYSTEM FOR MOTOR VEHICLES

[75] Inventors: Reinhold Abt, Stuttgart; Walter Blum, Bedburg; Jaromir Bordovsky, Berglen, all of Fed. Rep. of Germany

[73] Assignee: Daimler-Benz Aktiengesellschaft, Stuttgart, Fed. Rep. of Germany

[21] Appl. No.: 325,867

[22] Filed: Nov. 30, 1981

[30] Foreign Application Priority Data

Nov. 29, 1980 [DE] Fed. Rep. of Germany ....... 3045113

[51] Int. Cl.³ .......................... F15B 9/10; F15B 13/16
[52] U.S. Cl. .................................... 91/358 R; 91/380; 91/382
[58] Field of Search ..................... 91/380, 382, 358 R, 91/400; 180/132

[56] References Cited

U.S. PATENT DOCUMENTS

| | | | |
|---|---|---|---|
| 3,017,862 | 1/1962 | Freist | 91/382 |
| 4,170,925 | 10/1979 | Katz et al. | 91/400 |
| 4,189,023 | 2/1980 | Karcher et al. | 91/400 X |

FOREIGN PATENT DOCUMENTS

| | | | |
|---|---|---|---|
| 1039853 | 9/1958 | Fed. Rep. of Germany | 180/132 |
| 1455939 | 1/1969 | Fed. Rep. of Germany | 91/380 |
| 2408265 | 9/1975 | Fed. Rep. of Germany | . |

*Primary Examiner*—Robert E. Garrett
*Assistant Examiner*—Abram M. Bradley
*Attorney, Agent, or Firm*—Craig & Burns

[57] ABSTRACT

A power steering system for motor vehicles, wherein a steering nut, connected to a steering worm in such a manner that the steering worm is driven thereby, is rotatably and axially non-displacably mounted in a working piston and is also provided with a control arm passing through both a radial recess in a working piston and a radial opening in a cylinder housing that receives the working piston. An end of the control arm which is radially outermost with respect to an axis of the piston actuates a spool valve for adjusting the working pressure. Two corresponding followers are provided for defining the end stroke positions of the working piston. The followers are mutually engagable to lower or shut off a working pressure in the system. One of the followers is disposed opposite the working piston relative to the piston axis and the other is located opposite the cylinder housing relative to the cylinder axis with a zero motion. The followers having a zero motion with respect to the piston axis on the control arm and followers which have a zero motion with respect to the cylinder axis on a limiting housing part are so disposed that a mutual engagement of the corresponding followers results in actuation of the spool valve.

14 Claims, 7 Drawing Figures

POWER STEERING SYSTEM FOR MOTOR VEHICLES

The present invention relates to a steering system and, more particularly, to a power steering system for motor vehicles which includes a spool valve actuatable by a control arm of a steering neck for controling a working pressure in the power steering system, with followers being provided to lower the working pressure in a range of end to stroke positions of the working piston.

Power steering systems for motor vehicles have been proposed wherein a steering neck, connected to a steering worm gear in such a manner that a screwing motion is permitted, is mouned in a working piston rotatably and axially non-displaceable and is also provided with a control arm, with the arm passing through both a radial recess in a working piston and a radial opening in a cylinder housing that accommodates the working piston. A radially outermost arm of the control arm, with respect to the piston axis, actuates the spool valve, with the spool valve being adapted to adjust the working pressure. Two followers are provided for defining the two end stroke positions of the working piston with the followers being mutually engageable to lower or shut-off the working pressure. One of the followers is disposed opposite the working piston relative to the piston axis and the other of the followers is located opposite the cylinder housing relative to the cylinder axis with a zero motion.

A power steering system of the aforementioned type is proposed in, for example, ATZ 74 (1972), No. 7, pp 151–154, especially in FIGS. 17 and 18. In FIGS. 17 and 18, the followers, forced to move along a cylinder axis are formed by one flattened area on an end of the control pin, with the pin being disposed axially parallel to the cylinder axis in the working cylinder, and having a cylindrical piston cross section between its flattened areas. In this proposed construction, the followers, forced to move along the piston axis, are formed by two end openings of a bypass bore axially parallel to the piston axis, with the bore being traversed by the control pin. In a vicinity or area of each piston stroke end position, a bypass connection is produced between the two working pressure chambers whenever the opening of the bypass bore which is located opposite the stroke end crosses the corresponding flattened area.

A disadvantage of the last proposed construction is that the control pin reduces the effective piston cross section and a sealing of the bypass bore of the working piston requires a considerable amount of difficult work to assure a fitting of such seal.

A power steering system of another type is proposed in, for example, Offenlegungsschrift No. 24 08 265, wherein a steering wheel operates a pinion through a steering shaft, with the pinion meshing with a rack coupled to a pressure medium servo motor having a working pressure adjusted by a control valve. The control valve has a valve adjusting element connected to one lever arm of a two-armed control lever, with the other lever arm being kinematically connected to the pinion or steering shaft. One lever arm, at an end connected to the pinion, has an extension with two meshing surfaces for the stroke end positions. In a corresponding manner, the rack has an enaging element at each end, with the engaging element being adapted to actuate the control lever through engaging surfaces in the stroke end position so that the control valve moves into a neutral position which shuts off the working pressure.

Since the followers mounted on the rack are in the form of stops, in Offenlegungsschrift No. 2,408,265, when the working pressure is shut off the control valve, is moved to a position for the opposite lock by additional manual mechanical steering. Because of the unavoidable disadvantageous tolerances in the vehicle, this proposed power steering system does not permit the steering to turn to the vehicle end stop, which corresponds to the smallest turning circle.

Disadvantageously, however, if a limit switch is provided and constructed so that the smallest possible turning circle is reached, because of the above-noted tolerances in the prior art, the pressure drop may not be effective.

In Auslegeschrift No. 24 10 077, an arrangement is proposed wherein a manually adjustable and lockable threaded pin is used as a stop for a spool valve to adjust the working pressure, with the threaded pin limiting the throughflow cross section and hence the working pressure. After an adjustment of the adjustable pin is stopped, the pin is disposed so that it moves together with a valve cylinder accommodating the spool valve.

The aim underlying the present invention essentially resides in providing a power steering system for a motor vehicle with a shut off for a working pressure of the system in a vicinity of the stroke end positions of the working piston such that a further manual mechanical steering is possible until an end stop of the vehicle is reached, with the end stop determining the smallest possible turning circle of the motor vehicle.

In accordance with advantageous features of the present invention, the followers of the control arm having no motion with respect to a center axis of the working piston, and the followers formed by a limiting housing part in the cylinder housing space traversed by the control arm and having no motion with respect to the longitudinal center axis of the cylinder housing are disposed so that a mutual engagement of the corresponding followers results in an acutation of a spool valve of the power steering system.

Advantageously, in accordance with further features of the present invention, the spool valve is provided at a radially outer end with a control strip for engagement with a circumferential groove of the spool valve and a radial opening of the cylinder housing terminates in a valve cylinder receiving the spool valve, with the followers which have no motion with respect to the piston axis being disposed at axial ends of the control arm at a distance from the piston axis which is less than a distance of the control strip from the piston axis, and with the followers which have a zero motion with respect to the cylinder axis being disposed at a mutual axial distance which is less than an axial length of the control arm. The limiting housing part limits the radial opening accommodating the control arm and is disposed between the valve cylinder and cylinder bore accommodating the working piston.

The followers which have no motion with respect to the cylinder axis are, in accordance with the present invention, formed by a housing part in directions of the wall surfaces delimiting the cylinder axis.

In accordance with further features of the present invention, cams are integrally formed on the control arm at axial ends thereof.

The followers having no motion with respect to the cylinder axis, have, according to the present invention, a mutual spacing in directions of the cylinder axis which is greater than a length of the control arm with respect to the piston axis.

The control arm of the power steering system of the present invention is provided at radially outer ends thereof with a guide strip having two lateral sliding surfaces, with the lateral sliding surfaces being disposed symmetrically to a center or middle plane of the control arm which contains an axis of rotation of the steering nut. Each of the lateral sliding surfaces are adapted to be brought into sliding contact with a groove side wall of a circumferential groove of a control slot. The followers which have no motion with respect to the cylinder axis, are disposed at a distance from the cylinder axis generally equal to a distance of the guide strip from the axis of rotation of the steering nut. The engaging surfaces of the followers which have no motion with respect to the piston axis are disposed in an area of the guide strip which is located between the sliding surface.

Advantageously, the followers have a distance or space with respect to the cylinder axis or piston axis which is greater than an effective radius of the working piston.

In accordance with still further features of the present invention, at least one follower, which has no motion with respect to the cylinder axis, is adjustably mounted on the cylinder housing.

Accordingly, it is an object of the present invention to provide a power steering system for motor vehicles which avoids, by simple means, the shortcomings and disadvantages encountered in the prior art.

Another object of the present invention resides in providing a power steering system for a motor vehicle which eliminates the need for incurring additional expenses for sealing the power steering system.

Yet another object of the present invention resides in providing a power steering system for motor vehicles which enables the power steering system to execute the smallest possible turning circle without the need of a control valve being actuated in an undesirable manner by further manual steering.

A further object of the present invention resides in providing a power steering system for motor vehicles which functions reliably under all operating conditions of the motor vehicle.

A still further object of the present invention resides in providing a power steering system for motor vehicles which is simple in construction and, therefore, relatively inexpensive to manufacture.

Yet another object of the present invention resides in providing a power steering system for motor vehicles which ensures a shut off of a working pressure of the system in a vicinity of the stroke end positions of a working piston of the power steering system.

These and other objects, features, and advantages of the present invention will become more apparent from the following description when taken in connection with the accompanying drawings which show, for the purposes of illustration only, several embodiments in accordance with the present invention, and wherein:

Referring now to the drawings wherein like reference numerals are used throughout the various views to designate like parts and, more particularly, to FIGS. 1-3 and 7, according to these figures, a working piston generally designated by the reference numeral 8 is displaceably received in a cylinder bore 52 of a cylinder housing generally designated by the reference numeral 14, with the cylinder bore being centered on a longitudinally extending center cylinder axis 24—24 and a piston axis 15—15 of the piston 8 being aligned with the cylinder axis 24—24. A steering nut 10 is rotatably and axially non-displacably mounted in the working piston 10 by roller bearings generally designated by the reference numerals 53, 54, with an axis of rotation 44—44 of the steering nut 10 being aligned with the cylinder axis 24—24. The steering nut 10 is connected to a steering worm generally designated by the reference numeral 9 so as to permit the steering nut 10 to move by cooperating between a ball 55 and the steering worm 9, with the steering worm 9 passing outwardly through a housing cover 57 fastened to a cylinder housing 14 by fasteners such as, for example, bolts or screws 58. The housing cover 57 seals off the cylinder bore 52 from the outside. Another bearing arrangement generally designated by the reference numeral 56 mounts the steering work 9 in the housing cover 57 so as to enable the steering worm 9 to be rotatable with respect to the cylinder axis 24—24 and axially non-displacable with respect to the cylinder housing 14.

The steering nut 10 includes an integrally formed control arm 11 passing through a radial opening 12 in the working piston 8 and through a radial opening 13 in the cylinder housing 14. A control strip generally designated by the reference numeral 41 is disposed at a radially outer end 16 of the control arm 11, with the control strip 41 being axially parallel to the axis of rotation 44—44 of the steering nut 10. The control strip 41 engages a circumferential groove generally designated by the reference numeral 48 of a control slide generally designated by the reference numeral 17, with the control slides 17 being displaceably received in a valve cylinder generally designated by the reference numeral 15 which is integrated for motion with the cylinder housing 14. A valve cylinder 15 includes a middle valve connection 59 for connecting a pressure pump (not shown), two adjacent valve connections 60, 61 with the valve connection 60 being provided for a power steering booster at a left lock position and the valve connection 61 being provided for a power steering booster at a right lock position, as well as two outer valve connections 62, 63 connected to a return line (not shown). An annular seal generally designated by the reference numeral 66 is disposed in a circumferential groove of the cylinder housing 14, with the seal 66, in cooperation with the working piston 8, dividing the cylinder bore 52 into a working pressure chamber 64 to boost the right lock position and a working pressure 65 to boost a left lock position.

Figure 1:
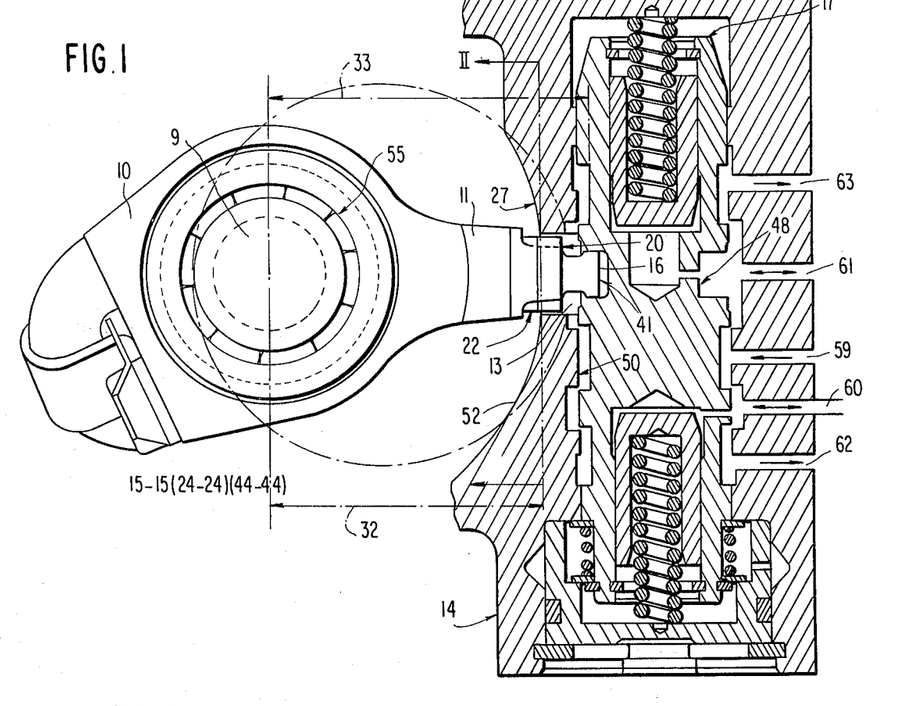
FIG. 1 is a partial cross sectional view taken along the line I—I in FIG. 7 through a power steering system constructed in accordance with a first embodiment of the present invention.
Figure 2:
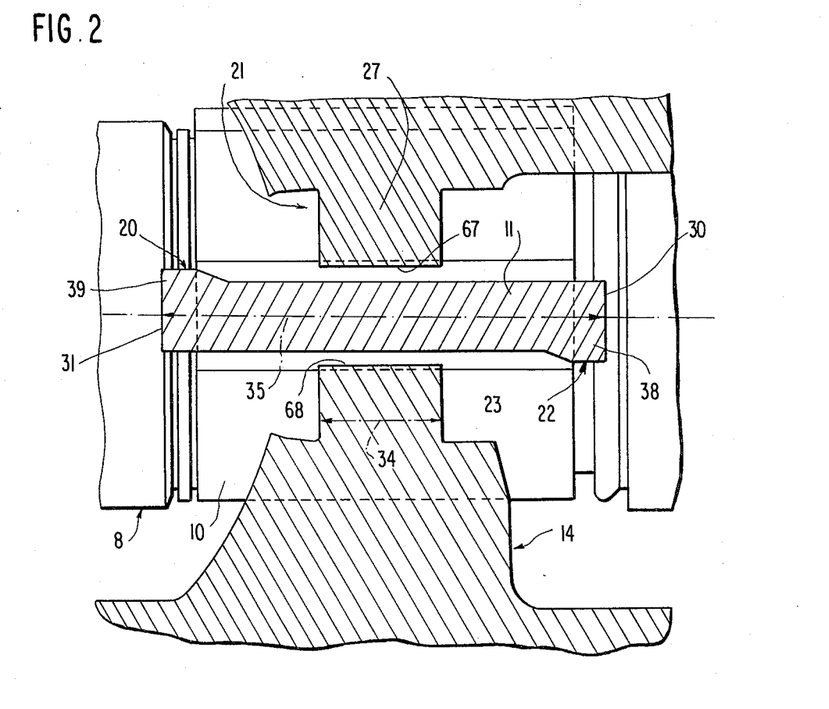
FIG. 2 is a partial cross sectional view taken along the line II—II in FIG. 1.
Figure 4:
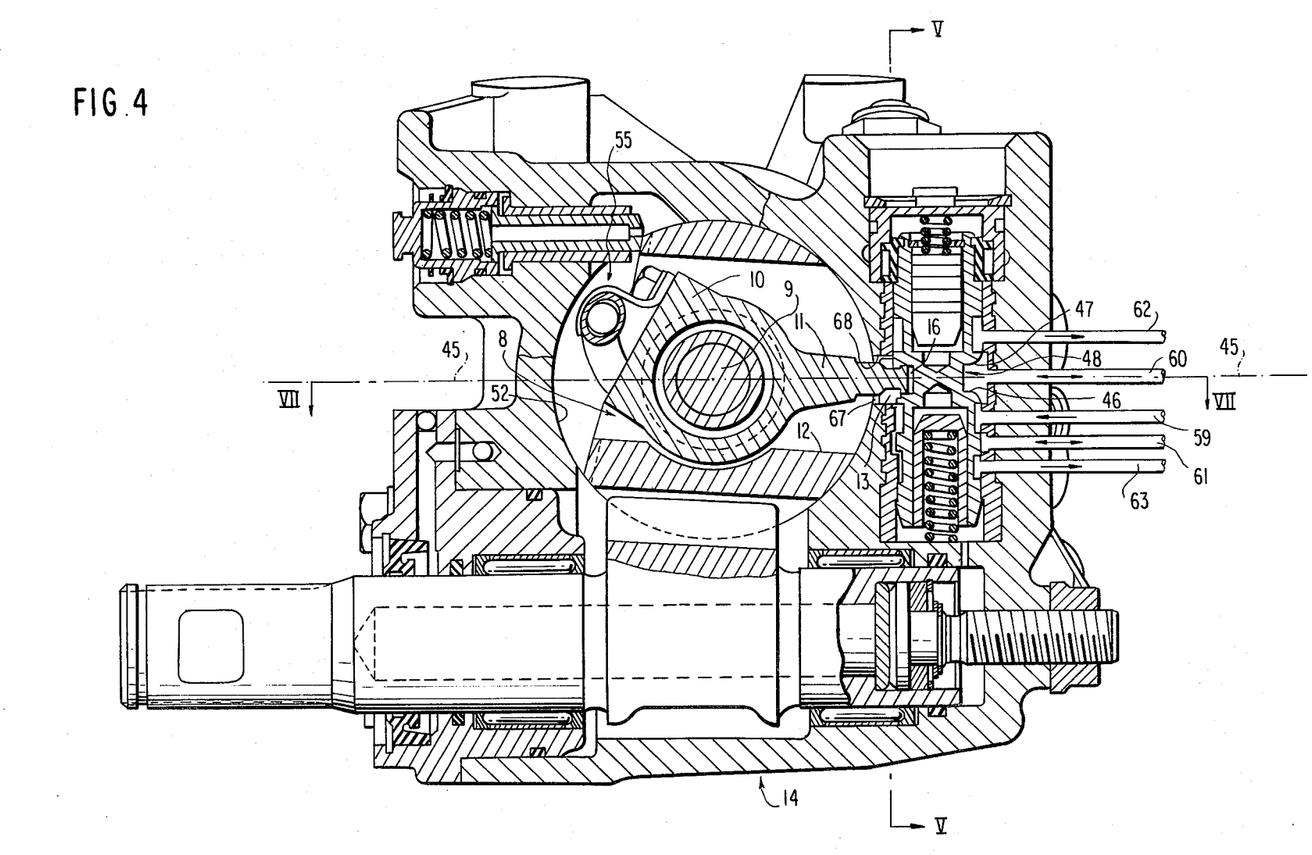
FIG. 4 is a cross sectional view taken along the line IV—IV in FIG. 7 of a power steering system constructed in accordance with a second embodiment of the present invention.
Figure 5:
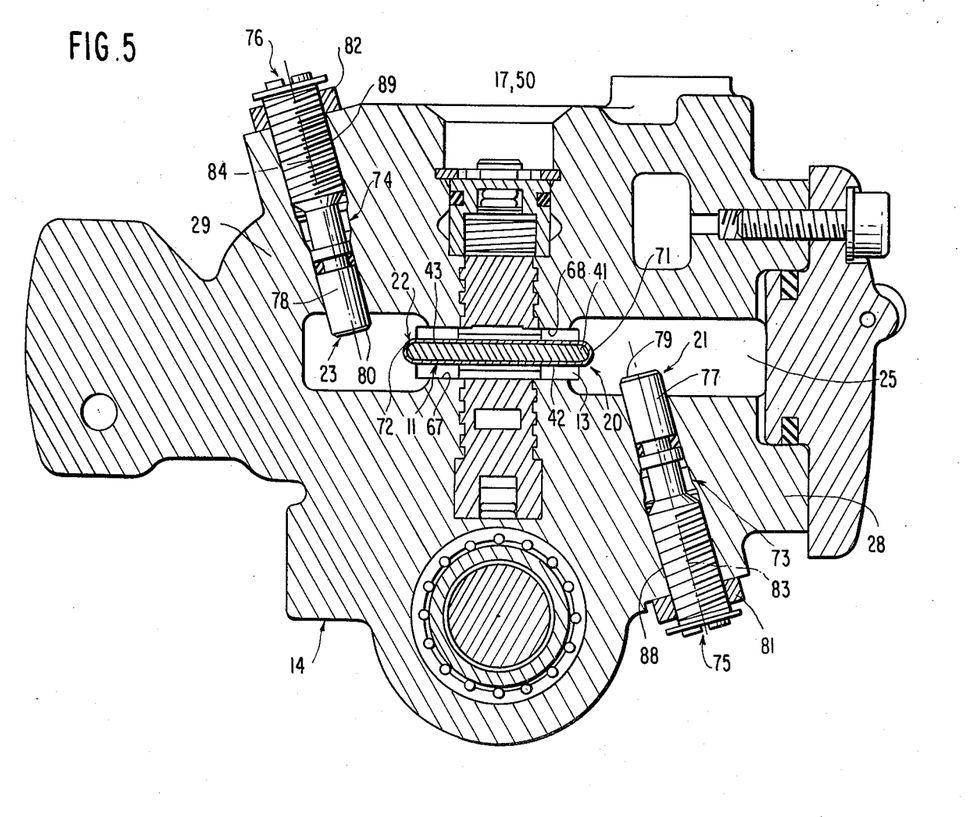
FIG. 5 is a cross sectional view taken along the line V—V in FIG. 4.
Figure 7:
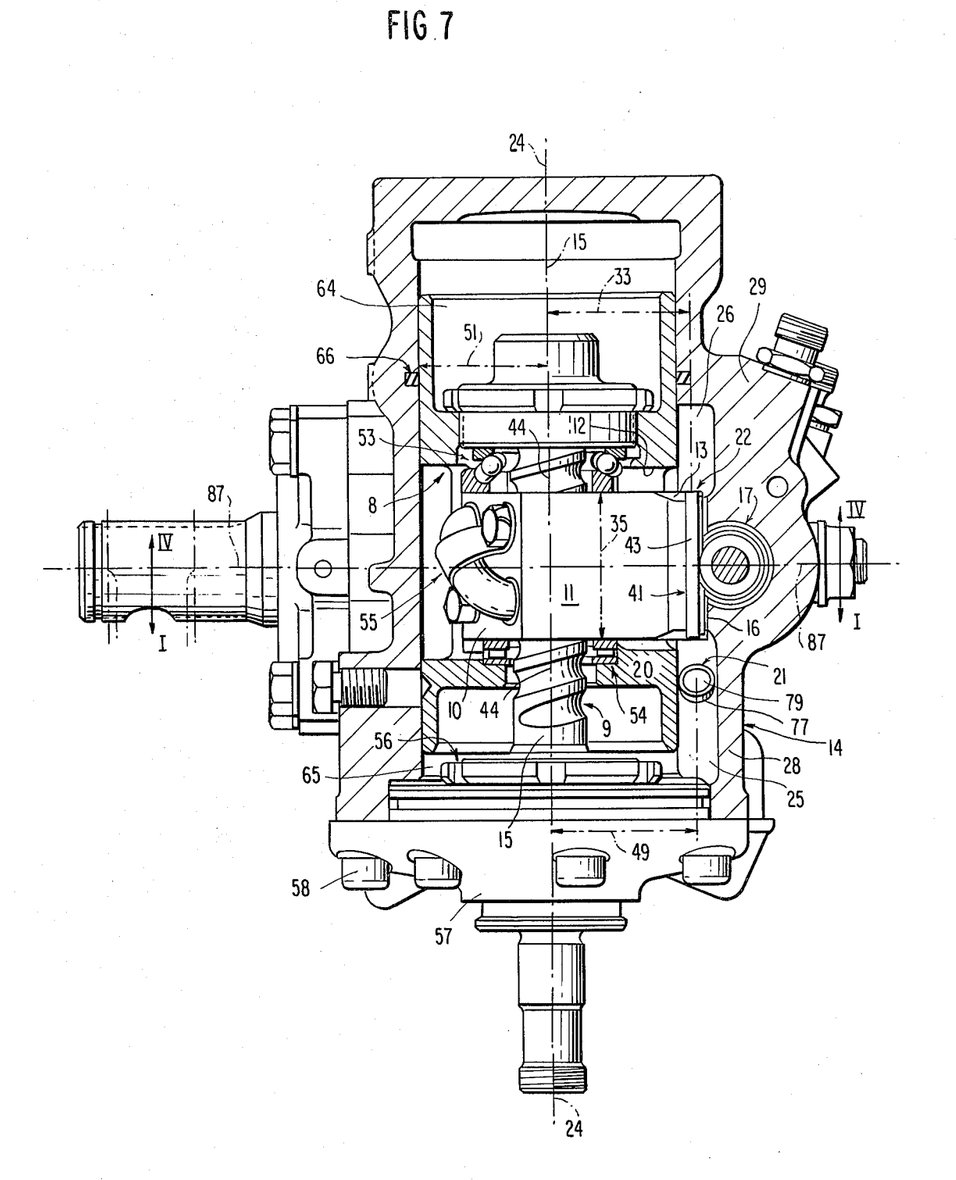
FIG. 7 is an actual cross sectional view of a power steering system constructed in accordance with the present invention taken along the line VII—VII in FIG. 4.

In FIGS. 1, 2, and 7, as well as FIGS. 4, and 5, to be described more fully hereinafter, the control arm 11 and hence a spool valve generally dsignated by the reference numeral 17 are in a middle neutral position for enabling a driving a vehicle in a straight line, wherein the working pressure is shut off, since the valve connections 60, 61 for the power steering boosting at the left lock position are connected by the adjacent valve connections 62, 63 to the return line. As the control arm 11 is moved in one or the other circumferential directions with respect to the axis of rotation 44—44 by turning the steering worm 9, one of the valve connections 60, 61 is connected to valve connection 59 and the return line is cut off from adjacent valve connections 62 or 63.

The steering motions or circumferential displacements of the control arm 11 are limited by the width or size of the opening 13 of the cylinder housing 14 and, for this purpose, the opening 13 is provided with stop surfaces 67, 68 for limiting a displacement in the circumferential direction with respect to the cylinder axis 24—24. If a working pressure fails or if a maximum pressure is reached in a vicinity of the middle stroke positions of the working piston 8, the control arm 11 will abut one of the stop surfaces 67 or 68, whereby the steering nut 10 is fixed in one circumferential direction with respect to the cylinder housing 14 and thus permits a further mechanical manual steering.

Figure 3:
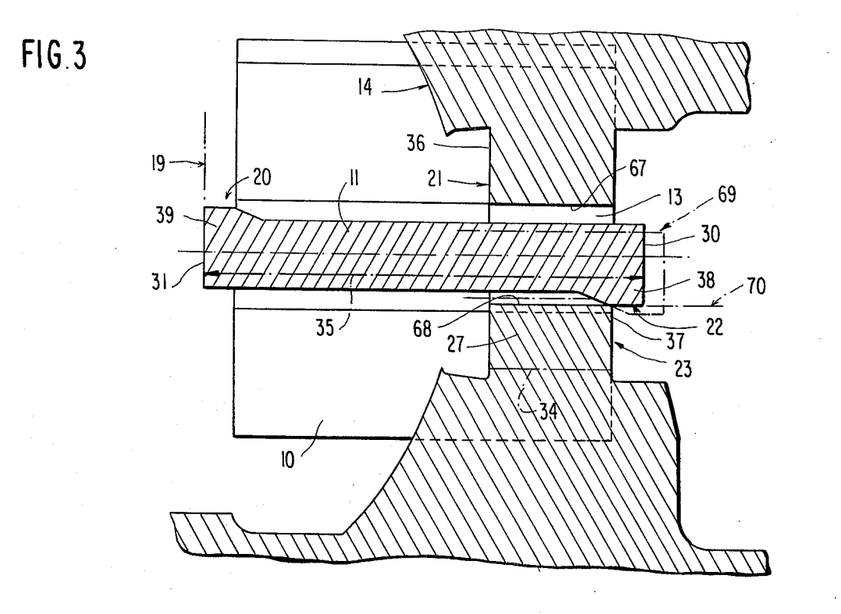
FIG. 3 is a partial cross sectional view, corresponding to FIG. 2, with a steering arm of the steering system being disposed in a different position.

In the power steering system of FIGS. 1-3, the followers generally designated by the reference numerals 20, 22 are provided on the control arm 11, with the followers 20, 22 being formed by cams 38 and 39 located at axial ends 30, 31 of the control arm 11 and form integrally with the control arm 11. The cams 38, 39 are located at a section of the control arm 11 which is located in the opening 13 of the cylinder housing 14 and are spaced from the axis of rotation 44—44 of the steering nut 10 at a smaller distance 32 than a distance 33 between the guide strip 41, located at the end 16 of the control arm 11, and the axis of rotation 44—44.

Additional followers generally designated by the reference numerals 21, 23 are provided at the cylinder housing 14, with the followers 21, 23 being located on a housing part 27 which has or forms an opening 13 and is located between the cylinder bore 52 and the valve cylinder 50. The followers 21, 23 are formed by wall surfaces 36, 37 which delimit or define the housing part 27 at a location of the opening 13 in directions of the cyliner axis 24—24, and are located or spaced apart at a mutual axial distance 34 which distance is less than an axial length 35 of the control arm 11.

As shown most clearly in FIG. 2, the working piston 8 and hence the control arm 11 are in a middle stroke position. Thus, the control arm 11 and the spool valve 14 can be steered in an area of medium stroke positions without any impediment up to corresponding end stops 67, 68. The spool valve 17, in a conventional manner, then sets a working pressure which increases directly with steering, with the working pressure reaching a maximum value shortly before reaching a corresponding end stop 67 or 68.

As shown in FIG. 3, the steering nut 10 and the steering arm 11 are in a position generally designated by the reference numeral 19 in which the working piston 8 is in an area of that end position of its stroke which corresponds to the left stop position. In FIG. 3, it is assumed that the control arm 11, prior to reaching the position 19, was actuated in a steering position generally designated by the reference numeral 69 in which the spool valve 17 sets the working pressure roughly to a maximum value. Upon reaching the position 19, the engaging surface 37 on the housing part 27 engages the cam 38 and the control arm 11, whereby the control arm 11 is actuated in a direction of a neutral position shown in FIG. 1 for travelling in a straight line. If, upon an increase in the left steering engagement, the cam 38 reaches the area 34 of the end stop 68, the control arm 11 is reset to a steering position 70 in which the spool valve 17 sets the working pressure to a value which is less than the maximum pressure. However, the cam 38 may extend in a corresponding circumferential direction with respect to the axis of rotation 44—44 such that the control arm 11, upon reaching a position 19, is reset completely to the neutral position illustrated in FIG. 1. When the control arm 11 is returning, the cam 38 may travel in an umimpeded fashion into the opening 30 and further mechanical steering, for example, increasing the left lock position manually, is possible without the spool valve 17 being influenced by such further steering in any manner until the vehicle reaches the end stop position for the smallest turning circle. Correspondingly, the cam 39 cooperates with the engaging surface 36 when the working piston 8 and, therefore, the steering nut 9 and the control arm 11 reach an area which is associated with the stroke end position corresponding to the right-hand stop position.

FIGS. 4-7 provide an example of a second embodiment of the power steering system wherein the guide strip 41 is provided on long sides thereof with sliding surfaces 42, 43, respectively, through which the steering arm 11 cooperates with the side walls 46 or 47 of a circumferential groove generally designated by the reference numeral 48 in an articulated and essentially zero-play fashion. The sliding surfaces 42, 43 are located symmetrically with respect to a central plane 45—45 of the steering nut 10, with the axis of rotation 44—44 being contained in the central plane 45—45. The followers 20, 22 of the steering arm 11 which are forced to move along the piston axis 15—15 in this embodiment are each formed by a rounded half of an end surface 71 or 72 at the ends of the guide strip 41. Additionally, the followers 20, 22 have a distance 33 from the axis of rotation 44—44 which is greater than an effective radius 51 (FIG. 7) of the working piston 8.

The cylinder housing 14 is provided in directions of the cylinder axis 24—24 on both sides of the opening 13 with one housing recess 25 or 26, with each recess 25, 26 opening both to the cylinder bore 52 and to the opening 13.

The control arm 11 and associated guide strip enter in the housing recesses 25, 26 during stroke movements of the working piston 8. Housing parts 28, 29 of the cylinder housing 14 delimit or define the housing recesses 25, 26, with a receiving bore generally designated by the references numerals 73, or 74 being respectively provided in the housing parts 28, 29 for enabling an insertion of a thread-adjusting pin 75 or 76. At an end of the thread adjustment pins 75, 76 facing the interior of the housing 14, each of the adjustment pins 75, 76 have an end pin 77 or 78, with an end of the end pins 77, 78 being formed to serve as an engaging surface 79 or 80 for engaging corresponding engaging surface 71 or 72 of the guide strip 41. The engaging surfaces 79, 80 are displacable in the directions of the corresponding longitudinal center pin axes 83, 84 of the adjustment pins 75, 76 by corresponding threaded connections 88 or 89 of the thread adjustment pin 75 or 76 with the housing part 28 or 29, whereby a corresponding distance 85 or 86 of the engaging surface 79 and 80 in the directions of the cylinder axis 24—24 may be changed to a stroke center position 87—87 shown in FIG. 7.

The thread adjustment pins 75, 76 are lockable on the cylinder housing 14 in a conventional manner through the use of appropriate lock nuts 81, 82. However, despite the possible change in the distances 85 and 86, the arrangement of the thread adjustment pins 75 and 76 on the cylinder housing 14 is accomplished in such a manner that the mutual spacing 40 the engaging surfaces 79, 80 which are non-movable relative to the housing 14 is always greater than an axial length 35 of the control arm 11. In this manner, the control arm 11, as shown most clearly in FIG. 5, may be steered or rotated in an unimpeded fashion up to end stops 67, 68 in a vicinity of the middle stroke positions of the working piston 8, in which the corresponding engaging surfaces 71, 79 and 72, 80 are disengaged.

Figure 6:
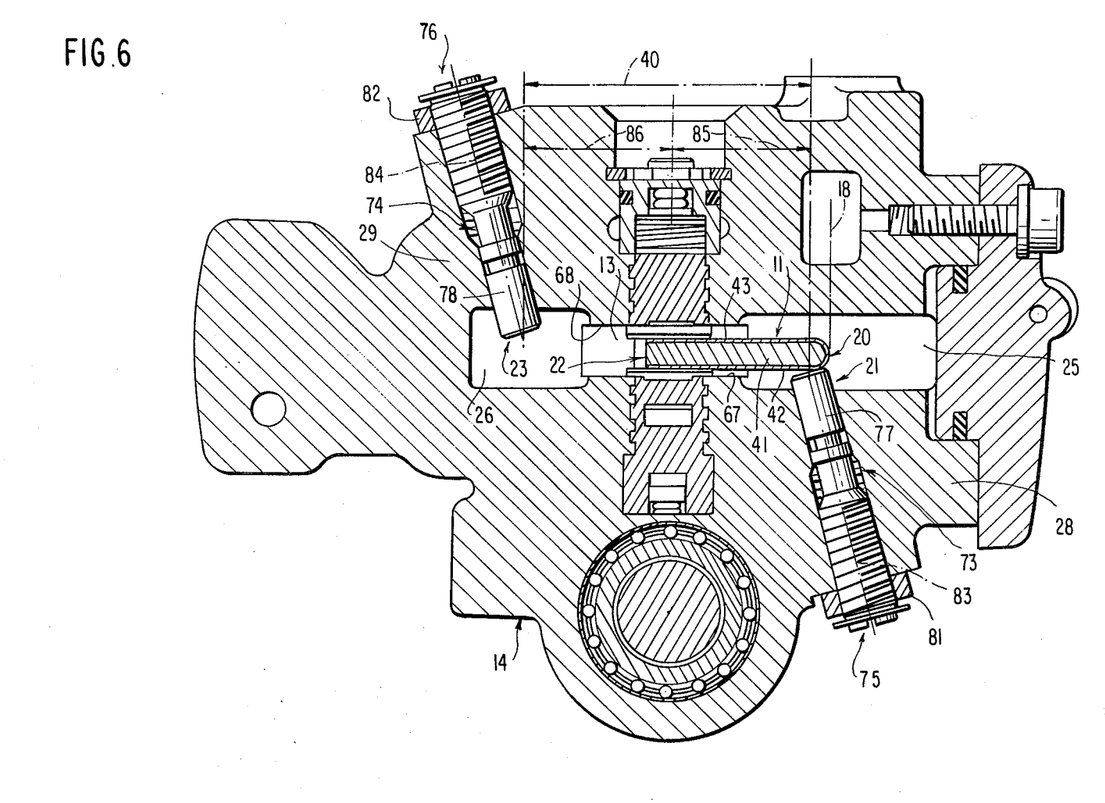
FIG. 6 is a cross sectional view corresponding to FIG. 5 with a steering arm of the steering system in a different position.

FIG. 6 provides an illustration of a status of the power steering system of the present invention when the working piston 8 and, therefore the steering or control arm 11 are in an area of the stroke end position 18 which corresponds to the right-hand stop position. In this area, the control arm 11 is re-set to the neutral position shown in FIG. 4 by a mutual engagement of the corresponding engaging surfaces 71, 79 relative to the end stop areas 67. Consequently, the spool valve 17 has set the working pressure to the value which is less than the maximum value. In this construction also, when the right-hand lock position is manually increased, there is no undesired influence on the spool valve 17 because the sliding surface 42 of the control arm 11 can slide in an unimpeded manner along the engaging surface 79 of the end pin 77. Additionally, in this construction, the thread adjustment pin 75 may be disposed so that, in the stroke end position 18, the control arm 11 is reset completely to a neutral position to shut off the working pressure. In a vicinity of the stroke end position of the working piston 8, at the left stop position, the corresponding engaging surface 72, 80 cooperate in corresponding fashion to reset the spool valve 17.

In order to be able to shut off or lower the working pressure in a vicinity of the end stroke positions of the working piston 8 according to the present invention, in both of the above described constructions, the followers 20, 22 of the control arm 11 and the followers 21, 23 of the cylinder housing 14, respectively, cooperate in such a manner that the spool valve 17 is actuated in the corresponding stroke end position in a direction of its neutral position for enabling the vehicle to travel in a straight line and, therefore, in a direction for shutting off or lowering the working pressure. The two constructions described hereinabove differ only in the spatial arrangement of the followers 20, 22, 21, 23 with respect to the control arm 11 or control housing 14 as well as the structural configuration of the respective followers.

While we have shown or described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A power steering system for motor vehicles, the system including a working piston means, a steering nut means rotatably and axially non-displacably mounted in said working piston means, a steering worm means connected to and rotated by the steering nut means, a cylinder housing means for accommodating the working piston means, a control arm means provided on the steering nut means, a spool valve means actuatable by said control arm means for adjusting a working pressure of the power steering system, a radial opening in the cylinder housing means for accommodating the control arm means, a radial recess means in the spool valve means for accommodating the control arm means, wherein means are provided for one of lowering and shutting off the working pressure of the power steering system in two end stroke positions of the working piston means such means including first follower means provided on the control arm means and second follower means provided on a portion of the cylinder housing means, the first follower means having a zero motion with respect to a longitudinal center axis of the working piston means and the second follower means having a zero motion with respect to a longitudinal center axis of the cylinder housing means, and the first and second follower means are arranged such that a mutual engagement of the respective follower means results in actuation of the spool valve means.

2. A power steering system according to claim 1, wherein the first follower means is disposed opposite the working piston means with respect to the axis of the working piston means, and the second follower means is located opposite to the cylinder housing means with respect to the axis of the cylinder housing means.

3. A power steering system according to one of claims 1 or 2, further comprising a control strip means being provided at the radially outer end of the spool valve means, and a valve cylinder means being provided for accommodating the spool valve means, a circumferential groove being provided in the spool valve means, with the control strip means being engageable in the circumferential groove, the radial opening in the cylinder housing means terminating in the valve cylinder means, the first follower means being disposed at axial ends of the control arm means at a distance from the axis of the working piston means which is less than a distance of the control strip means from the axis of the working piston means, the second follower means being formed by a limiting housing part of the cylinder housing means in an area of the housing means traversed by the control arm means, said limiting housing part defining the limits of the radial opening, the radial opening being located between the valve cylinder means and a cylinder bore in the cylinder housing means accommodating the working piston means, and the second follower means being disposed at a mutual axial distance which is less than an axial length of the control arm means.

4. A power steering system according to claim 3, wherein the limiting housing part forming the second follower means extends in a direction of wall surfaces defining the axis of the cylinder housing means.

5. A power steering system according to claim 4, wherein cam means are integrally formed at axial ends of the control arm means for forming the follower means on the control arm means.

6. A power steering system according to one of claims 1 or 2, wherein the second follower means have a mutual spacing in directions of the axis of the cylinder housing means which is greater than a length of the control arm means with respect to the axis of the working piston means.

7. A power steering system according to claim 6, comprising a guide strip means being provided at a radially outer end of the control arm means, the guide strip means including two lateral sliding surfaces disposed symmetrically with respect to a center plane of the control arm means, with an axis of rotation of the steering nut means being located in the center plane of the control arm means, a control slide means being provided having a circumferential groove therein, the sliding surfaces being adapted to be brought into contact with a side wall of the circumferential groove in the control slide means, a distance of the second follower means from the axis of the cylinder housing means being at least approximately equal to a distance of the guide strip means from the axis of rotation of the steering nut means, the first follower means being provided with engaging surfaces, and the engaging surfaces being disposed in an area of the guide strip means located between the sliding surfaces.

8. A power steering system according to claim 7, wherein the first and second follower means are spaced from one of the axis of the cylinder housing means and the axis of the working piston means by a distance greater than an effective radius of the working piston means.

9. A power steering system according to claim 8, wherein at least one of the follower means is adjustably mounted on the cylinder housing means.

10. A power steering system according to claim 9, wherein said adjustably mounted follower means is the second follower means.

11. A power steering system according to claim 6, wherein a guide strip means is provided at a radially outer end of the control arm means, the guide strip means includes two lateral sliding surfaces disposed symmetrically with respect to a center plane of the control arm means, with an axis of rotation of the steering nut means being located in the center plane of the control arm means, a control slide means is provided having a circumferential groove therein, the sliding surfaces are adapted to be brought into contact with a side wall of the circumferential groove in the control slide means, a distance of the second follower means from the axis of the cylinder housing means is at least approximately equal to a distance of the guide strip means from the axis of rotation of the steering nut means, the first follower means is provided with engaging surfaces, and in the engaging surfaces are disposed in an area of the guide strip means located between the sliding surfaces.

12. A power steering system according to claim 11, wherein at least one of the follower means is adjustably mounted on the cylinder housing means.

13. A power steering system according to claim 1, wherein the first and second follower means are spaced from one of the axis of the cylinder housing means and the axis of the working piston means by a distance greater than an effective radium of the working piston means.

14. A power steering system according to claim 1, wherein cam means are integrally formed at axial ends of the control arm means for forming the follower means on the control arm means.

* * * * *